US006143986A

United States Patent [19]

Anderson et al.

[11] Patent Number: 6,143,986

[45] Date of Patent: Nov. 7, 2000

[54] METHOD AND ARRANGEMENT FOR EASILY REPAIRING ELECTRICAL HARNESS FOR AIRCRAFT JET ENGINE

[75] Inventors: John J. Anderson, San Diego; Leslie Travis; Eric R. Balders, both of Chula Vista, all of Calif.

[73] Assignee: Rohr, Inc., Chula Vista, Calif.

[21] Appl. No.: 09/061,996

[22] Filed: Apr. 17, 1998

Related U.S. Application Data

[63] Continuation of application No. 08/634,862, Apr. 19, 1996, abandoned.

[51] Int. Cl.[7] .............................. H02G 3/00; B21F 15/02

[52] U.S. Cl. ............................ 174/72 A; 174/34; 174/36; 174/75 R; 174/84 R; 29/402.1; 156/49; 439/99

[58] Field of Search ................................ 174/70 R, 71 R, 174/72 R, 72 A, 84 R, 85, 71, 88 C, 32, 33, 34, 36, 75 R, 75 D, 92, 102 R, 105 B; 439/99, 585, 610; 29/402.01, 825, 828; 156/47, 49, 51, 53, 54, 56; 244/228, 232, 233

[56] References Cited

U.S. PATENT DOCUMENTS 1,876,585 9/1932 Austin ....................................... 174/85

5,091,604 2/1992 Kirma ......................................... 174/2

*Primary Examiner*—Hyung S. Sough

*Attorney, Agent, or Firm*—Patrick J. Schlesinger; James M. Rashid

[57] ABSTRACT

An enhanced electrical harness arrangement for an aircraft engine that is arranged to provide optimum protection of the electrical conductors from extreme thermal, EMI, vibration and chafing problems encountered in service. The harness arrangement provides a high degree of repairability thereby ensuring a long service life for the harness wile also minimizing the time required for necessary repairs to the electrical conductor terminals. A repair splice member has an electrical conductor bundle inserted through it and is spaced from a connection of the electrical conductor bundle to an aircraft gas turbine engine. The repair splice member is placed within an outer protective layer of the harness and is provided with shoulder portions, as is the backshell, for accommodating removal and replacement, as required, of protective layers of the harness positioned between the repair splice member and the backshell thereby permitting unraveling or damaged portions of the protective layers to be replaced and electrical conductor connections to be repaired in an airworthy repair procedure without the necessity of replacement of the entire harness in the field. A method for conducting such repair procedures for the harness arrangement is disclosed.

19 Claims, 2 Drawing Sheets

32

METHOD AND ARRANGEMENT FOR EASILY REPAIRING ELECTRICAL HARNESS FOR AIRCRAFT JET ENGINE

This is a continuing application of application Ser. No. 08/634,862 filed on Apr. 19, 1996 now abandoned.

BACKGROUND OF THE INVENTION

The present invention relates to an improvement in electrical harnesses for aircraft jet engines and more particularly, but not by way of limitation, to a method and arrangement for providing in an electrical harness construction a repair splice means for protective layers of the electrical conductors to materially improve the repairability of such conductors and associated connectors in the field.

In the operation of aircraft jet engines it is common to provide various electrical harnesses that are electrically coupled to the engine and to associated equipment. Such electrical harnesses are commonly subjected to high temperature, high vibration conditions and to chafing of the harnesses against an engine by such vibration. At one time it was common to provide electrical harnesses that included groups of conductors that had been bundled together without significant protection. While such arrangements were marginally acceptable at an earlier time further developments in aircraft engines and their control have left such arrangements outmoded. It is also now believed that the temperature and vibration conditions had been underestimated.

Since it is common now for an aircraft engine to be operated on a Full Authority Digital Engine Control (FADEC), a fly-by-wire arrangement, it is now necessary to provide electromagnetic (EMI) shielding, thermal shielding, and chafing protection for the electrical conductors. Such electric harness arrangements may provide electrical circuits for other purposes associated with a jet engine, such as a fire detection circuit. These electrical conductors are typically provided with layers of such protection and are electrically connected to a suitable connector means for electrical connection to the engine and associated equipment. The electrical connector means is received by a backshell that physically couples the electrical connector means to the protective layers.

While the described electrical harness arrangement is satisfactory as installed, such arrangement is not amenable to repair in the field. Commonly, the high temperature, high vibration and associated chafing conditions experienced by the electrical harnesses tend to cause problems, particularly in the electrical connection of the conductor lines to the connector means and the connection of the connector means to the engine.

Typically, the thrust of the efforts to enhance the repairability of such harnesses in the field have centered on development of the backshell arrangement. In use and during repair procedures of the electrical connections it is common for the ends of the protective layers of the harness arrangement to become disturbed, worn and frayed. Since such protective layers are continuous for an electrical harness it does not require overly significant damage to the ends of the protective layers to render the entire electrical harness useless since such an item is a flight safety issue and must be in optimum condition for use on an aircraft. Since such electrical harnesses are considered to be relatively expensive, it is evident that there is an unmet need for an electrical harness for an aircraft jet engine that has been optimized for protection of the electrical conductors and which affords ease of repairability of such a harness in the field. Also, such harness must meet the applicable FAA Federal Airworthiness Regulations (FAR 25).

Accordingly, it is a general object of this invention to provide a method and arrangement for providing ease of repairability of such electrical harnesses in the field as may be required while providing for a full service life of the harness.

It is a further general object of the invention to provide a repair regime which may easily be performed in the field as required with a minimum of equipment and in a minimum of time.

It is yet another object of the invention to provide an optimized electrical harness for protection of the electrical conductors and which easily accommodates the presently disclosed repair regime.

The foregoing has outlined some of the more pertinent objects of the invention. These objects should be construed to be merely illustrative of some of the more prominent features and application of the intended invention. Many other beneficial results can be attained by applying the disclosed invention in a different manner or by modifying the invention within the scope of the disc sure. Accordingly, other objects and a fuller understanding of the invention may be had by referring to the summary of the invention and the detailed description of the preferred embodiment in addition to the scope of the invention defined by the claims taken in conjunction with the accompany drawings.

SUMMARY OF THE INVENTION

Briefly stated, the present invention contemplates a method and arrangement for easily preparing an electrical harness arrangement for an aircraft jet engine that is subjected to high temperatures and high vibration in use. The electrical harness includes a central electrical conductor means and multiple layers of optimized protective layers to satisfy a number of criteria. The harness has at least two ends with the conductor means being connected at each end to a suitable connector means. The conductor means has at least first and second protective layers to provide EMI protection and chafing protection. Other layers may be provided to provide thermal protection and the like. A suitable backshell means receives the connector means and physically couples such connector means to the protective layers. The backshell means is provided with exterior shoulder portions which receive the first and second primary protective layers are secured thereon by means of suitable clamps, which are preferably spring clamps.

A repair splice means for splicing a protective layer if the need should arise in a repair procedure is included at pre-defined locations in the harness at predetermined distances from an associated backshell means. Preferably, this repair splice means has a central bore for receiving the conductor means and is inserted within the harness interiorly of the outer protective layer. The repair splice means is preferably provided with longitudinally extending shoulder portions. When the need for repair of the electrical connections to the connector means or to the engine arises, the clamps are removed from the backshell means to afford access to such connections for the required repair. In such instance of an initial repair or where the ends of the protective layers have not been damaged beyond repair, the protective layers are moved away from the backshell so that the repair may be affected.

However, in the event that such ends of the protective layers are damaged the portion of such layers between the backshell means and the repair splice means are removed so that the electrical repairs may be accomplished. Thereafter, the removed portions of such layers are replaced by new correctly sized portions of the identical layers. The replaced portions of the protective layers are secured to the shoulder portions of the backshell means and to shoulder portions of the repair splice means by clamping by suitable clamps, such as spring clamps. The terminated end of the original outer protective layer is clamped to an outer shoulder portion of the repair splice means as well.

The foregoing has outlined rather broadly the more pertinent and important features of the present invention in order that the detailed description of the invention that follows may be better understood so that the present contributions to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar numerals refer to similar parts in all FIGURES.

DETAILED DESCRIPTION OF THE INVENTION

Figure 1:
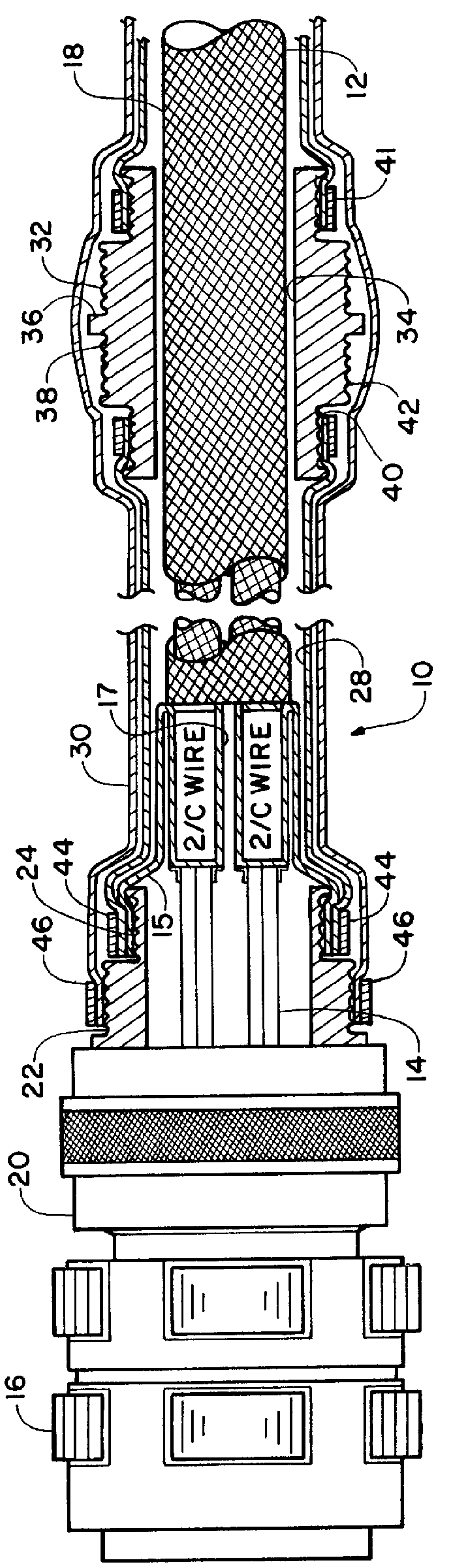
FIG. 1 is a side view shown partially in section of an electrical harness for an aircraft engine constructed in accordance with the present invention.

Referring now to the drawings in detail and in particular to FIG. 1, reference character 10 generally designates an electrical harness constructed in accordance with a preferred embodiment of the present invention. The electrical harness 10 is intended for use on an aircraft jet engine and during in service use will experience high temperatures that can exceed 300° C., high vibration and chafing resulting from such vibration. Under FAR 25, such electrical harness 10 must also withstand 2000° F. for a period of 15 minutes. While the harness 10 is described as having at least two ends it is common for the harness to have as many ends as may be required for a particular engine application and usually will exceed two.

The harness 10 will include a central electrical conductor means 12 which will include a plurality of two conductor wires 14 which are suitably connected to a suitable connector means 16. The connector 16 receives the bare wires of the conductor wires and correctly spatially orients them for appropriate connection to electrical connections on the aircraft jet engine or to associated equipment or control means for the engine, as for example, the FADEC equipment for an aircraft. The connector 16 is conventional and commercially available from a number of sources.

Figure 5:
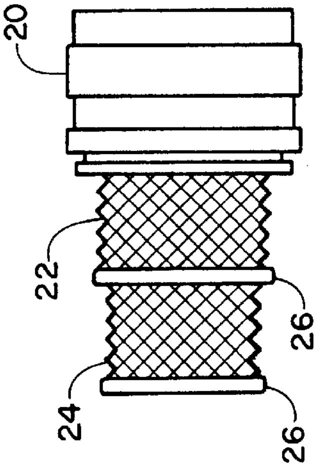
FIG. 5 is a side view of a backshell employed in the instant invention.

The conductor bundle 12 preferably receives an initial protective layer 18 to provide thermal protection for the bundle 12. Typically, this layer 18 is in the form of an overbraid of NEXTEL ceramic fiber material or S-2 fiberglass or a similar suitable material. The connector 16 to which the conductor bundle is electrically coupled in a suitable backshell assembly 20 which cooperates in securing the connector 16 to the electrical connections on the engine or other equipment and to providing a physical connection between the connector means 16 and the protective layers. The general details of the backshell assembly are known and will not be described in detail herein. However, the backshell 20, as illustrated in FIGS. 1 and 5, has a novel feature that provides an important aspect of the instant invention. The backshell 20 is configured to provide a first shoulder portion 22 and a second shoulder portion 24 which extend rearwardly from the area of the backshell 20 where attachment to the electrical connector means 16 is made. The surfaces of the shoulder portions 22 and 24 are preferably knurled and circumferential shoulders 26 are provided to ensure the separation of such shoulder portions and to enhance the clamping capability of the clamping means as will be described in detail hereinafter.

As will be seen in FIG. 1, in the connection of conductors 12 to the connector means 16 ends of the wires 14 are exposed and the end portion or pigtail 15 of a suitable electromagnetic interference (EMI) shielding 17, such as a metallic overbraid, for each two wire conductor 14 is extended forwardly for securement on the second shoulder portion 24 of the backshell assembly 20 for providing electrical continuum for the EMI shielding through the harness 10. It is to be noted that the pigtail 15 extends from the shoulder portion 24 of the backshell 20 to a portion of the overbraid 17 spaced from a position closer to such shoulder 24 to permit the backshell 20 to be pushed longitudinally away from the connector means 16 for ease of performing a repair procedure.

The conductor bundle 12 is further covered with a first protective layer 28 that will provide suitable EMI shielding for the bundle 12 to protected against electromagnetic disturbances due to occurrences such as lightning strikes and over voltages. Preferably, this shielding 28 will take the form of a suitable nickel plated copper overbraid. A further second protective layer 30 covers the layer 28 and is intended to provide chafing protection for the harness 10. In operation of an aircraft jet engine, high vibration is encountered and may cause the harness 10 to have rubbing or chafing contact with the very hot engine and/or accessories and cause premature wear if chafing protection is not provided. The outer protective layer 30 is preferably formed of an overbraided material that may be for example, polyetheretherketone (PEEK) or similar fiber or a suitable metallic material. For applications below around 260° C., PEEK material would be preferred while for applications above 260° C., a metallic material would be preferred.

Figure 4:
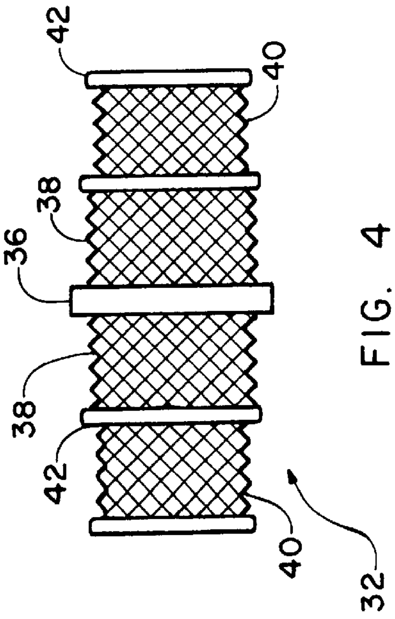
FIG. 4 is a side view of the repair splice means employed in the invention.

To enable repairs to be made easily to the connector 16 and electrically connected conductor bundle 12 a novel repair splice member 32 is provided. The metallic repair splice member 32 is positioned in the harness 10 a predetermined distance from the backshell 20 and is located interiorly of the outer protective layer 30. As seen in FIGS. 1 and 4, the repair splice member 32 is provided with a central bore 34 for easily accommodating the conductor bundle 12 and is considered to be easily slidable upon such bundle 12. The repair splice member 32 is provided with a suitable central outer circumferential peripheral shoulder 36 and first and second shoulder portions 38 and 40 which extend longitudinally in both directions from the central shoulder 36. Suitable circumferential shoulders 42 are interposed at the ends of the shoulder portions 38 and 40 to assist in defining suitable configurations for receiving terminal ends of the protective layers 28 and 30 and providing optimum clamping configurations for clamp means that will be further described herein. The outer surfaces of the shoulder portions 38 and 40 are suitably knurled to assist in the clamping action. The metallic repair splice member 32 is composed of a suitable metal such as stainless steel and also ensures electrical continuity of the metallic overbraid 28 that provides a first protective layer for the conductor bundle 12.

The harness 10 is seen in FIG. 1 as it is initially installed. It will be seen that the terminal end of the protective layer 28 is clamped to a shoulder portion 40 of the splice member by any suitable means such as a spring clamp 41 or wire bands. This connection is considered then to be relatively permanent. A length of protective layer 28 is then positioned or slid over the conductor bundle and is clamped by suitable clamping means to the second shoulder portion 40 of the splice member 32 and is additionally clamped to shoulder portion 24 of the backshell member 20 over the end portion of the outer wire shield layer 18 of the conductor bundle 12. The clamping of the inner protective layer 28 to the shoulder portion 24 may be accomplished in any suitable manner such as spring clamps 44 or wire bands. The outer protective layer 30 is then seen to extend forwardly for clamping onto the shoulder portion 22 in a suitable manner such as by spring clamps 46 or stainless steel bands. Thus, electrical harness 10 as initially installed has optimized protective layers provided, which layers include provisions for thermal protection and EMI protection for the conductor bundle, and an exterior chafing protective layer. In addition, the repair splice member 32 has been positioned within the electrical harness 10 to provide easy splicing of protective layers as may be necessary to accomplish a needed repair.

Figure 2:
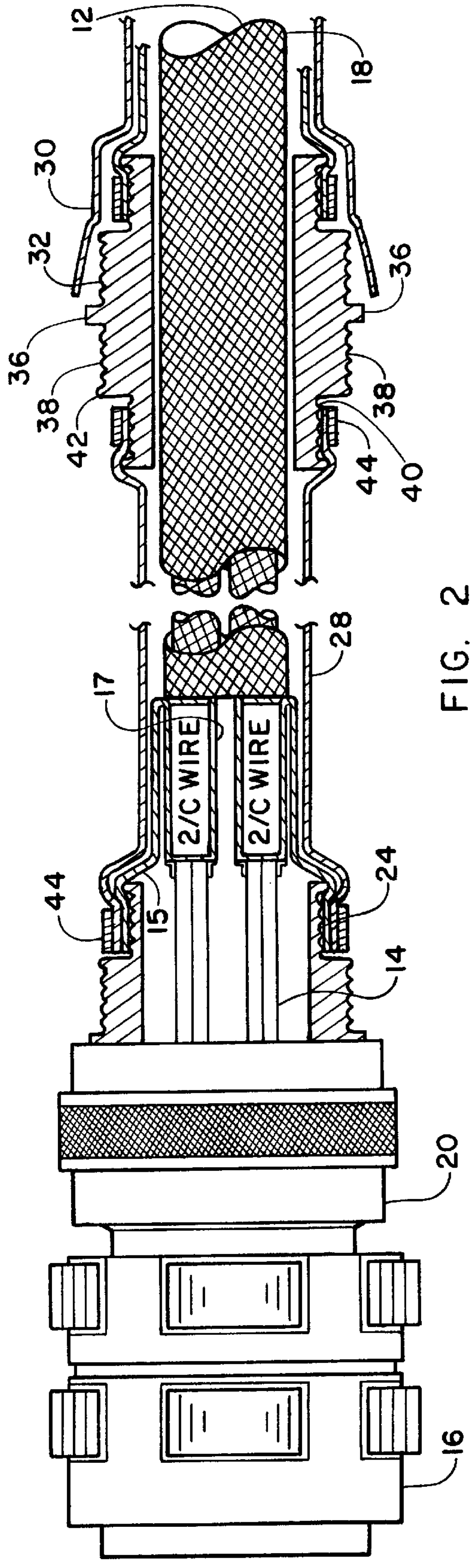
FIG. 2 is a side view shown partially in section of the electrical harness of FIG. 1 that illustrates an aspect of the method of the instant invention.
Figure 3:
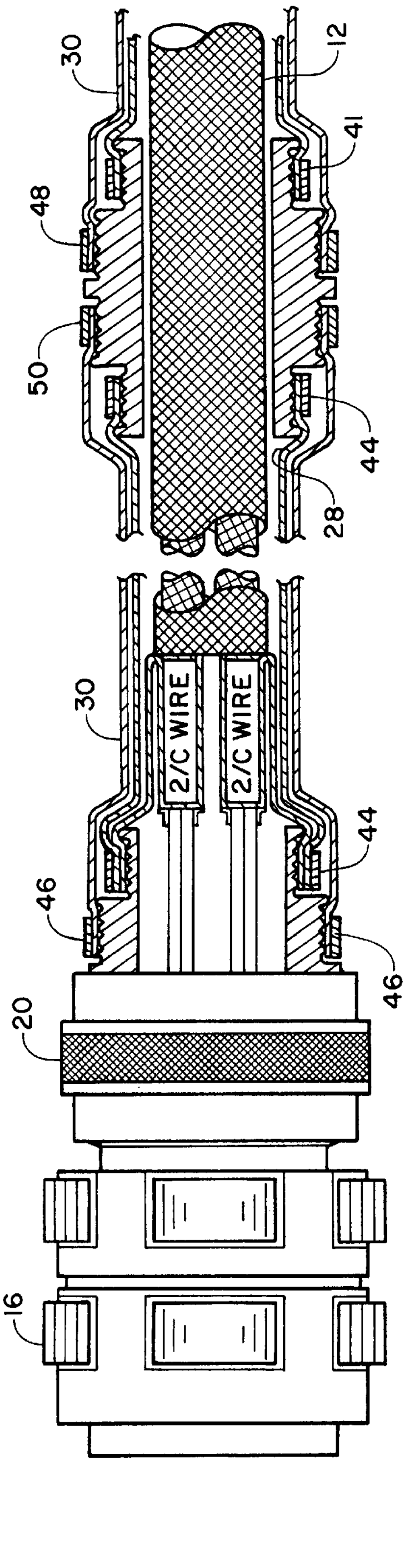
FIG. 3 is a side view shown partially in section which illustrates the electrical harness after a repair has been completed.

Referring now to FIGS. 2 and 3, it will be seen how the electrical harness 10 can easily accommodate a repair or multiple repairs to the connector 16 and the connections to the conductor bundle 12. When it is desired to obtain access in the field to the connector means 16 and the connected conductor bundle 12 while the harness 10 is secured on an aircraft engine and within the confines of a covering cowl, the band 46 is removed and the outer protective layer 30 is pushed back sufficiently to expose the clamps or bands 44 for removal and thereby permit the protective layer 28 to be exposed and for its end to be also pushed back if required to permit full access to the connector assembly 16 and to the electrical connections to the conductor bundle 12. After the repair has been made the elements are accordingly reassembled in reverse order to the arrangement seen in FIG. 1 in the event that the ends of the protective layers 28 and 30 are perceived to be in satisfactory condition.

For illustrative purposes, it will be perceived if at the time of the first repair or at a subsequent repair of a prior art electrical harness that the ends of protective layers are unsuitable and, typically, beginning to unravel, such event in the past would generally have required the replacement of the entire harness, which replacement would have been a time consuming and expensive maintenance procedure. However, the harness 10 of the present invention in the event of a judgment that the ends of the protective layers were beginning to unravel can be easily repaired without requiring replacement of the harness. In such instance, that portion of the outer layer 30 extending from the backshell 20 to the central shoulder 36 of the splice member 32 is severed by a suitable hot knife tool (not shown) to preclude further unraveling from the position of such cut and is removed. The terminus end of the outer layer 30 is then secured to a shoulder portion 38 of the splice member 32 by any suitable manner such as by a spring clamp 48 or wire clamping bands. A specific spring clamp that has been used to advantage in the practice of this invention is known as the Ti-Dex Band clamp made by the BAND-IT company of Denver, Colo.

Recognizing that at this point in the repair procedure the backshell 20 and the connector assembly 16 have been removed to permit repair of the electrical connections, a replacement portion of the protective layer 28 or the protective layer 30, as may be required, are positioned or slid over the conductor bundle 12 and pushed up as required to permit reassembly of the harness as seen in FIG. 3 thereby re-establishing the electrical continuity of the protective layer 28. The clamps are replaced in position and clamps 48 and 50 are use to finally clamp the outer protective layer 30 in position on the backshell 20 and splice member 32.

It will be appreciated that the foregoing repair procedure may be repeated as required and the novel electrical harness is capable of accommodating continuing repairs as may be required without the necessity of replacing an entire harness assembly because of certain unsuitable conditions. Thus, the present invention has met the need for an enhanced electrical harness for an aircraft jet engine that is subject to high temperature, high vibration, and chafing conditions and provides optimized protection for such conditions while also providing a degree of repairability that was previously unknown in the art.

The present disclosure includes features that are contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention. For example, while the invention has been described with particular application to the repair of the connector and the connected conductor bundle it would be within the scope of the invention for it to be applied as well and in the same manner to a repair problem occurring in the harness between two splice members.

What is claimed is:

1. An electrical harness arrangement for an aircraft jet engine to provide in situ easily repairable connections associated with the jet engine and being subjected to high temperatures, high vibration, and chafing in use and having at least two ends and which arrangement comprises:

a central electrical conductor means which extends from one end of the harness arrangement to another end and that has a connector means connected to each of said ends for providing an electrical interface to an aircraft jet engine and associated equipment;

at least a first protective layer surrounding the electrical conductor means to provide a first type of protection for such conductor means;

it least a second protective layer surrounding said first protective layer to provide a second type of protection for such conductor means;

a backshell means for receiving said connector means and coupling said first and second protective layers to said connector means through a connection of said backshell means to said connector means, the backshell means having shoulder portions spaced longitudinally away from a terminal end of said central electrical conductor means for receiving the first and second protective layers, and repair splice means receiving the electrical conductor means through a central aperture and positioned interiorly of said second protective layer and spaced longitudinally from said backshell means associated with one end of the electrical harness arrangement, said repair splice means having longitudinally extending outer shoulder means whereby, when said connector means and the associated conductor means require repair, a portion of the first and second protective layers between the backshell means and the repair splice means may be removed as necessary to afford access to the connector means and after such repair is completed in-situ the effected portions of the first and second protective layers may be replaced, as required, and secured in their original protective positions to provide the intended types of protection.

2. The electrical harness arrangement of claim 1 wherein said repair splice means is provided with a central outer circumferential shoulder and additional outer shoulder portions extending longitudinally in two opposite directions from the central shoulder for receiving said first and second protective layers.

3. The electrical harness arrangement of claim 2 which further includes clamp means which secure said protective first and second layers to said shoulder portions of the backshell means and to shoulder portions of said repair splice means as may be required after a repair procedure has been accomplished.

4. The electrical harness arrangement of claim 3 wherein the clamp means are spring clamps.

5. The electrical harness arrangement of claim 1 wherein the first protective layer is a metallic braided material to provide protection against electromagnetic disturbances.

6. The electrical harness arrangement of claim 1 wherein the second protective layer is an overbraided material to provide chafing protection.

7. The electrical harness arrangement of claim 5 wherein the second protective layer is an overbraided material to provide chafing protection.

8. The electrical harness arrangement of claim 6 wherein the second protective layer is an overbraided metallic material to provide chafing protection in a very elevated temperature environment.

9. An improvement for easily repairing an electrical harness, for an aircraft jet engine, that is subject to high temperatures, high vibration, and chafing in use, which harness has at least two ends and includes a central electrical conductor means, a first protective layer surrounding the electrical conductor means to provide electromagnetic protection for the electrical conductor means, a second protective layer surrounding the first protective layer to provide chafing protection for the electrical conductor means, and an electrical connector means connected to each end of the electrical conductor means for coupling to the aircraft jet engine, and a backshell means receiving the connector means and provided with shoulder means for receiving said first and second protective layers, which improvement comprises:

a repair splice means that is slidably positioned on the electrical conductor means a predetermined distance from a backshell means and, further, is positioned interiorly of the second protective layer, said repair splice means being provided with outer shoulder means extending longitudinally in opposite directions from an outer central circumferential shoulder for clampingly receiving an end portion of the first protective layer and, in the event a repair is made to the electrical connector means and its connection to the electrical conductor means which requires removal of a portion of said second protective layer extending between the backshell means and the repair splice means, for clampingly receiving a replacement second layer portion for that portion of the second protective layer that extends between the repair splice means and the backshell means.

10. The improvement of claim 9 wherein the outer shoulder means of the repair splice leans includes first shoulder portions and second shoulder portions extending in opposite directions from the central circumferential shoulder for securing thereto said first and second protective layers.

11. The improvement of claim 10 wherein the shoulder portions are configured to receive clamp means to secure said first and second protective layers to the repair splice means as required.

12. The improvement of claim 11 wherein the clamp means are spring clamps that are adapted to be received on shoulder portions of the repair splice means for the purpose of clamping portions of the first and second protective layers to the shoulder portions of said repair splice means and said backshell means.

13. A method for easily repairing in situ an electrical harness arrangement having at least two ends for providing electrical connections associated with an aircraft jet engine and being subject to high temperatures, high vibration and chafing in use, the harness arrangement including a central electrical conductor means and at least first and second protective outer layers, for providing at least two types of protection for the electrical conductor means, and backshell means that receives the connector means and which is provided with shoulder portions for receiving said first and second protective layers, the method comprising the steps of:

positioning a metallic repair splice member, having outer shoulder portions, over the central electrical conductor means a predetermined distance from the backshell means and interiorly of the second protective layer, securing the first protective layer to a shoulder portion of the backshell means and to an outer shoulder portion of the repair splice member and further securing the second protective layer to an outer shoulder portion of the backshell means, and when the electrical connector means and associated electrical connection to the electrical conductor means require repair, releasing the first and second protective layers from securement to the backshell means to accomplish such repairs.

14. The method of claim 13 which further includes the step of removing that portion of the second protective layer extending from the repair splice means to the backshell means and replacing it with a like portion of second protective layer and securing such replacement second layer to the backshell means and to the repair splice member.

15. The method of claim 14 which further includes the step of securing the portion of the second protective layer extending from the backshell means to a shoulder portion of the repair splice member.

16. The method of claim 15 wherein the securing step is accomplished by using spring clamps.

17. The method of claim 13 which includes the step of forming the first protective layer of a metallic overbraid material to provide protection against electromagnetic disturbances for said electrical conductor means.

18. The method of claim 17 which includes the step of forming the second protective layer of a material to provide anti-chafing protection for the electrical harness arrangement.

19. The method of claim 17 which further includes the step of forming the second protective layer of a metallic overbraided material to provide anti-chafing protection for the electrical harness arrangement in a very elevated temperature environment associated with an aircraft jet engine.

* * * * *